US005525249A

United States Patent [19]

Kordonsky et al.

[11] Patent Number: 5,525,249

[45] Date of Patent: Jun. 11, 1996

[54] MAGNETORHEOLOGICAL FLUIDS AND METHODS OF MAKING THEREOF

[75] Inventors: Viliyam Kordonsky; Sveltana Demchuk; Igor Prokhorov; Zinovii Shulman, all of Minsk, Belarus

[73] Assignee: Byelocorp Scientific, Inc., New York, N.Y.

[21] Appl. No.: 485,413

[22] Filed: Jun. 7, 1995

Related U.S. Application Data

[63] Continuation of Ser. No. 149,156, Nov. 5, 1993, abandoned, which is a continuation of Ser. No. 868,466, Apr. 14, 1992, abandoned.

[51] Int. Cl.$^6$ .............................. H01F 1/44; B32B 15/01

[52] U.S. Cl. .................................... 252/62.56; 252/62.52; 252/62.54; 252/62.51 R; 428/403; 428/900; 428/611

[58] Field of Search ............................. 252/62.51, 62.52, 252/62.53, 62.54, 62.56, 74, 76, 51.5 R, 52 R, 572, 573; 427/128, 132, 216, 217, 215; 428/403, 900, 928, 611

[56] References Cited

U.S. PATENT DOCUMENTS

| | | | |
|---|---|---|---|
| Re. 32,573 | 1/1988 | Furumura et al. | 252/62.52 |
| 2,020,714 | 12/1935 | Wulff et al. | 252/56 R |
| 3,897,350 | 7/1975 | Heiba et al. | 252/33.4 |
| 4,992,190 | 2/1991 | Shtarkman | 252/62.52 |

FOREIGN PATENT DOCUMENTS

| | | |
|---|---|---|
| 1089968 | 1/1984 | U.S.S.R. . |
| 1154938 | 1/1985 | U.S.S.R. . |

*Primary Examiner*—Prince Willis, Jr.
*Assistant Examiner*—Alan D. Diamond
*Attorney, Agent, or Firm*—Kenyon & Kenyon

[57] ABSTRACT

A magnetorheological fluid composition comprising magnetosolid particles, magnetosoft particles, a stabilizer, and a carrying fluid comprising an aromatic alcohol, a vinyl ester, and an organic solvent or diluent carrier such as kerosene, in proportions sufficient to provide substantially no agglomeration or sedimentation of magnetic particles over temperatures of from about −50° to 120° C. The composition can be made by preparing a carrying fluid comprising a vinyl ester, an aromatic alcohol and kerosene; preparing a first carrying fluid composition comprising magnetosoft particles, a stabilizer and a first sample of the carrying fluid; preparing a second carrying fluid composition comprising magnetosolid particles and a second sample of the carrying fluid; and admixing the first carrying fluid composition and the second carrying fluid composition.

18 Claims, No Drawings

MAGNETORHEOLOGICAL FLUIDS AND METHODS OF MAKING THEREOF

This application is a continuation of U.S. Ser. No. 08/149,156, filed Nov. 5, 1993, now abandoned, which is a continuation of U.S. Ser. No. 07/868,466, filed Apr. 14, 1992, now abandoned.

FIELD OF THE INVENTION

This invention relates to magnetorheological fluids, and more particularly to fluids containing a suspension of material which will change the fluid properties when acted on by a magnetic field, and methods for making such fluids.

BACKGROUND OF THE INVENTION

Fluids containing magnetic material are known in the art. Such fluids are designed to change viscosity or other fluid properties upon application of a magnetic field to the fluid. Typical uses of known magnetic fluid compositions have included shock absorbers, clutches, and actuating modules. However, prior art fluids have suffered from several disadvantages. Prior art fluids generally are not useful over a wide range of temperature. Known magnetic fluids also have suffered from instability of the magnetic particles in suspension. Such instability can include settling of the particles over time due to gravitational forces and/or agglomeration of the particles in the fluid suspension.

Shtarkman, U.S. Pat. No. 4,992,190, describes a fluid responsive to a magnetic field comprising magnetizable particulate, silica gel as a dispersant and a vehicle. Shtarkman discloses a fluid composition comprising 20% by weight of silicone oil and 80% by weight of a mixture of carboxyl iron (99% by weight) and pre-dried silica gel (1% by weight). Shtarkman discloses that such a fluid is useful as the dampening fluid in a shock absorber. Shtarkman discloses that reduced magnetic particles can have an insulation coating (such as iron oxide) to prevent particle-to-particle contact, eddy currents or dielectric leakage.

Fluids such as those described by Shtarkman have limited commercial applicability. The silicone oil vehicle is a poor lubricant, particularly on steel surfaces, and must be combined with lubricants and mineral oils to overcome this disadvantage. Moreover, the high compressibility of silicone oils is undesirable since it increases the time for system response to a magnetic field. Additionally, the silicone oils do not dissolve surfactants easily, precluding the use of nonorganic stabilizers.

Chagnon, U.S. Pat. No. 4,356,098, describes a ferrofluid composition comprising a colloidal dispersion of finely-divided particles in a liquid silicone-oil carrier and a dispersing amount of a surfactant which comprises a silicone-oil surfactant containing a functional group which forms a chemical bond with the surface of the particles and a tail group which is soluble in the silicone-oil carrier. Fluids such as those disclosed by Chagnon suffer from an inability to viscosity to a sufficient degree upon application of a magnetic field. Such fluids generally change in viscosity by a factor of about two, which is considered unacceptable for many applications.

OBJECTS AND SUMMARY OF THE INVENTION

In light of the foregoing, it is an object of the invention to provide a stable magnetorheological fluid. It is a further object of the invention to provide a magnetorheological fluid which is stable over a range of temperature.

It is a further object of the invention to provide a magnetorheological fluid in which the magnetic particles do not settle or agglomerate over time.

It is a further object of the invention to provide a magnetorheological fluid which responds quickly to application of a magnetic field.

These and other objects of the invention are achieved by a magnetorheological fluid composition comprising magnetosolid particles, magnetosoft particles, a stabilizer, and a carrying fluid comprising an aromatic alcohol, a vinyl ether, and an organic solvent or diluent carrier such as kerosene, in proportions sufficient to provide substantially no agglomeration or sedimentation of magnetic particles over temperatures of from about −50° to 120° C. The invention further comprises a method for making a magnetorheological fluid composition comprising a method of making a stable magnetorheological fluid composition comprising preparing a carrying fluid comprising a vinyl ether, an aromatic alcohol and an organic solvent or diluent carrier such as kerosene; preparing a first carrying fluid composition comprising magnetosoft particles, a stabilizer and a first sample of the carrying fluid; preparing a second carrying fluid composition comprising magnetosolid particles and a second sample of the carrying fluid; and admixing the first carrying fluid composition and the second carrying fluid composition.

DETAILED DESCRIPTION OF THE PREFERRED EMBODIMENTS

The magnetorheological fluid composition of the present invention comprises a non-colloidal ferromagnetic powder suspended in a carrying fluid which contains a stabilizer.

The ferromagnetic particles of the invention are a mixture of coarse magnetosoft particles and fine magnetosolid particles. The magnetosoft particles preferably are made from carbonyl iron. The magnetosoft particles are generally spherical in shape. A preferred particle size range is about 1 to about 10 μm, though broader ranges are suitable. It is more important that the magnetosoft particles be proportionately larger than the magnetosolid particles. Preferably, the magnetosoft particles are at least about ten times larger than the magnetosolid particles.

The magnetosolid particles preferably are made from iron oxide or chromium dioxide. The magnetosolid particles are anisodiametric in shape. A preferred particle size range is about 0.1 to about 1.0 μm, though relative size to the magnetosoft particles is considered more important to achieving the properties of the invention.

Magnetosoft carbonyl iron particles are produced by thermal decomposition of pentacarbonyl iron ($Fe(CO)_5$). Preferred carbonyl iron particles are commercially marketed powders used in conjunction with radioengineering equipment, such as those sold under Russian trademarks P-10, P-20, P-100, or those marketed by GDS BASF under the trademarks SF, TH, E. Iron oxide needle-like magnetosolid particles can be produced by oxidation of a magnetite such as $Fe_3O_4$. Chromium dioxide particles preferably are formed by the decomposition of chromium angidrid ($CrO_3$) under high pressure in the presence of oxygen.

The magnetosolid particles preferably are adsorbed onto the surface of the magnetosoft particles, imparting to the magnetic particles a brush-like effect. The magnetosolid particles are preferably small, needle-like magnets which attach at one end to the more coarse magnetosoft particles. Adsorption of magnetosolid particles onto magnetosoft particles has been shown to give the resulting fluid composition higher stability and greater relative viscosity change upon application of a magnetic field. Preferably, the magnetosoft particles are multidomain, that is, they are randomly distributed in a volume of liquid, and have no residual magnetization. The magnetosolid particles are preferred to have a needle-like shape and have their own magnetic moments, in order to provide the brush-like effect described above with the magnetosoft particles.

The carrying fluid of the invention is made from an organic solvent or diluent carrier, an aromatic alcohol, and a vinyl ether. A preferred organic solvent is a liquid hydrocarbon such as kerosene. The organic solvent preferably has low volatility, good anti-corrosion properties, low toxicity, and high flash temperature and temperature of self-ignition. A preferred aromatic alcohol is α-naphthol ($C_{10}H_7OH$). A preferred vinyl ether is polyvinyl-n-butyl ether ($(CH_2{=}CHOC_4H_9)_n$). The aromatic alcohol and vinyl ether preferably contain one or more of the following properties: solubility in the organic solvent; low freezing temperature (preferably below about 100° C.); ability to thicken the organic solvent; and resistance to mechanical loading (preferably up to about $10^6$ Pascals shear stress under flow). The aromatic alcohol and the vinyl ether are dissolved in the organic solvent to form the carrying fluid.

Other components can also be added to the carrying fluid, such as antifoaming agents, such as polysiloxane compounds, antiwear agents, such as tricresylphosphate ($(CH_3C_6H_4O)_3PO$).

The addition of an aromatic alcohol and a vinyl ether to the organic solvent creates a carrying fluid having a higher viscosity, greater lubricant properties and greater protection against breakdown of the organic solvent than the organic solvent alone. Preferably, the carrying fluid contains 90 to 95 parts by weight organic solvent, 0.01 to 0.10 parts aromatic alcohol, and 4.9 to 9.99 parts vinyl ether. A particularly preferred carrying fluid composition comprises 92.75 weight percent kerosene, 0.05 weight percent α-naphthol, and 7.2 weight percent polyvinyl-n-butyl ether.

In most preferred embodiment of the invention, a stabilizer is used in addition to the carrying fluid to provide added stability to the fluid composition. Preferred stabilizers include unhydrated, inorganic silicone compounds. A particularly preferred stabilizer is AEROSIL ($SiO_2$).

The stabilizer particles preferably are approximately 0.005–0.015 μm in diameter and are preferred to be about one-tenth to two-tenths the size of the magnetosolid particles. The relatively small diameter of the stabilizer particles results in the particles having a relatively large surface area. A stabilizer particles surface area of about 350 to 400 $m^2/g$ is preferred.

The stabilizer particles can be spherical in shape and preferably are non-porous. The stabilizer particles are designed so that in a shear flow, the structure formed by the particles are reversibly deformed. Preferably, the stabilizer is present in an amount of about 4 to 9 weight percent of the carrying fluid.

The magnetorheological fluid composition of the invention preferably is made using a multi-step process comprising admixing the carrying fluid ingredients, adding a stabilizer and magnetosoft particles to a first admixture of carrying fluid, adding magnetosolid particles to a second admixture of carrying fluid, and combining the two magnetic particle-containing carrying fluid compositions. The carrying fluid preferably is formed by dissolving the vinyl ether and aromatic alcohol in kerosene at ambient conditions.

The first carrying fluid admixture contains 5 to 25 parts by weight of magnetosoft particles to 10 parts of carrying fluid, and formed under continuous mixing. The stabilizer preferably is injected into the first carrying fluid admixture by use of a pulverizer.

A sufficient amount of stabilizer is added until a gelatinous composition is obtained, typically about 5 to 15 weight percent of the first carrying fluid admixture. Then the magnetosoft particles are added to the composition, which is homogenized, such was with a ball mill. Ball milling will minimize agglomeration of the magnetosoft particles which may occur upon addition to the composition.

The magnetosolid particles are added to the second admixture of carrying fluid and homogenized, such as by agitation. It is preferred that about 1 to 15 parts by weight magnetosolid particles per 10 parts by weight carrying fluid be present. Preferably, a surfactant is employed in this stage of the process to facilitate complete dispersion of the magnetosolid particles. The surfactant preferably is a fatty acid, with oleic acid being particularly preferred. The surfactant can minimize coagulation of the dispersed magnetosolid particles, and to aid in stably dispersing the particles in suspension. Preferably, less than 5 weight percent surfactant is employed in the second carrying fluid admixture, with less than one percent particularly preferred.

The two particle-containing carrying fluid mixtures are combined and homogenized. A ball mill is suitable for this purpose. Preferably, approximately 5 to 10 parts by weight of the first carrying fluid mixture, containing the magnetosoft particles, is added per 100 parts by weight of the second carrying fluid mixture. The resultant suspension is stable and responsive to application of a magnetic field.

Magnetorheological fluids of the present invention can be used in a variety of applications, such as polishing, seals, casting technology, controlled heat carriers, drives, clutches, hydraulic systems, and vibration systems (such as shock absorbers), including in conventional applications already known in the art. The fluids can be used in a variety of polishing applications such as optical lens polishing, and polishing of ceramics, the inner surfaces of tubes and pipes, and semiconductor materials. The fluids are particularly suitable for polishing objects having irregular shapes. The fluid can be used in heat carrier applications such as heat exchangers and audio speakers. Typical drive systems which can employ the fluid of the invention include robotics and actuating modules. Other applications for magnetorheological fluids known in the art may also take advantage of this novel composition.

In a lens polishing application, the composition, which can optionally include abrasive polishing particles, is contacted with a workpiece to be polished. Upon application of a magnetic field, the fluid viscosity changes and the fluid starts moving. In a preferred method of operation, the workpiece is immersed in the composition and the field is applied such that the fluid flows circularly around the workpiece. As the magnetic particles and/or the abrasive polishing particles contact the workpiece, the workpiece is polished. Using the composition of the invention, irregular-shaped objects and difficult to polish articles such as those made from crystal can be polished effectively.

EXAMPLE

A magnetorheological fluid of the invention was made using the following process. First, a carrying fluid sample was formed by dissolving 7.2 parts of polyvinyl-n-butyl ether 0.05 parts of α-naphthol in 92.75 parts kerosene.

A first carrying fluid admixture is prepared by injecting AEROSIL ($SiO_2$) A-380, manufactured by Industrial Association Chlorvinyl, Kalysha City, Ukraine, into the carrying fluid prepared as described above. Injection took place over an hour until a homogenous gelatinous system was obtained. Then, iron carboxide powder was added to the admixture. The entire admixture was homogenized in a ball mill over a period of 4 to 5 hours. The proportion of ingredients was iron carboxide powder (50 weight %), aerosil (7.5 weight %), carrying fluid (42.5 weight %).

Chromium dioxide powder, oleic acid and a second carrying fluid sample were mixed and homogenized for 4 to 5 hours in a universal agitator in the following proportions:

Chromium dioxide power—36 weight %

Oleic acid—0.36 weight %

Carrying fluid—63.63 weight %

Next, the two magnetic particle-containing carrying fluid admixtures were combined and mixed in a ball mill for an hour to arrive at a final composition. 100 grams of the iron carboxide-containing admixture were added to 7.5 grams of the chromium dioxide powder-containing admixture. The resulting product exhibited changed viscosity, plasticity, elasticity, thermoconductivity, and electroconductivity in response to application of a magnetic field. The fluid was stable at temperatures of −50° to 120° C. The composition was tested in a cylindrical coaxial rotary viscometer supplied by a magnetic field inductor. The applied field intensity H was varied up to 80 kA/m, and the shear rate 7 was varied from 1.02 to 444.5 seconds$^{-1}$. The response of the fluid viscosity to the magnetic field intensity is given in Table I below. It can be seen from Table I that increasing field intensity results in increasing viscosity at a given shear rate. The data in Table I also indicate that increasing shear rate results in generally lower viscosity at a given field intensity. Highest viscosity was obtained at low shear rate and high field intensity.

TABLE I

| | H, kA/m | | | | | | | | |
|---|---|---|---|---|---|---|---|---|---|
| | 0 | 12.7 | 24.2 | 35.0 | 43.6 | 48.2 | 62.0 | 77.0 | 84.0 |
| γ, $s^{-1}$ | η, Pa.s | | | | | | | | |
| 1.02 | 0.81 | 5.32 | 31.94 | 51.86 | 87.76 | 135.6 | 438.8 | 492.0 | 585.1 |
| 1.84 | 0.54 | 3.23 | 36.85 | 29.32 | 56.44 | 76.24 | 249.2 | 300.6 | 329.9 |
| 2.97 | 0.39 | 2.27 | 11.79 | 20.41 | 38.10 | 50.80 | 158.8 | 190.5 | 208.7 |
| 5.42 | 0.33 | 1.49 | 6.99 | 11.49 | 23.48 | 29.97 | 89.91 | 107.3 | 117.4 |
| 9.10 | 0.29 | 1.03 | 4.56 | 9.13 | 14.72 | 19.72 | 63.27 | 78.48 | 85.35 |
| 16.45 | 0.27 | 0.91 | 2.63 | 5.35 | 8.56 | 12.68 | 39.53 | 49.41 | 50.23 |
| 27.70 | 0.24 | 0.73 | 1.71 | 3.40 | 5.44 | 8.16 | 25.76 | 32.07 | 34.51 |
| 49.40 | 0.22 | 0.49 | 1.08 | 2.03 | 3.19 | 4.81 | 15.66 | 20.79 | 22.14 |
| 82.30 | 0.18 | 0.34 | 0.71 | 1.31 | 1.99 | 2.91 | 10.37 | 13.77 | 15.06 |
| 147.80 | 0.17 | 0.26 | 0.48 | 0.86 | 1.24 | 1.84 | 6.64 | 8.69 | 9.64 |
| 246.0 | 0.14 | 0.19 | 0.32 | 0.56 | 0.77 | 1.08 | 4.05 | 5.29 | 5.78 |
| 444.5 | 0.12 | 0.14 | 0.20 | 0.32 | 0.44 | 0.59 | 2.21 | 2.92 | 3.13 |

We claim:

1. A magnetorheological fluid composition comprising:

first particles comprising magnetosolid particles having their own magnetic moment comprising oxidized magnetite or chromium dioxide;

second particles comprising magnetosoft particles being relatively larger in size than said magnetosolid particles and having adsorbed on their surface said magnetosolid particles;

a stabilizer; and a carrying fluid comprising an aromatic alcohol, a vinyl ether, and an organic solvent, in proportions sufficient to provide substantially no agglomeration or sedimentation of magnetic particles over temperatures of from about −50° to 120° C.

2. A composition according to claim 1 further comprising oleic acid.

3. A composition according to claim 1 wherein the magnetosolid particles are from about 0.1 to about 1.0 μm in diameter.

4. A composition according to claim 3 wherein the magnetosoft particles are made from carbonyl iron.

5. A composition according to claim 4 wherein the carbonyl iron particles are from about 1 to about 10 μm in diameter.

6. A composition according to claim 1 wherein the magnetosolid particles are needle-like and are adsorbed onto the surface of the magnetosoft particles.

7. A composition according to claim 1 wherein the aromatic alcohol is α-naphthol, the vinyl ether is polyvinyl-n-butyl ether and the organic solvent is kerosene.

8. A composition according to claim 1 wherein the stabilizer is silicon dioxide.

9. A magnetorheological fluid composition comprising:

(a) 20 to 70 parts of magnetosoft carbonyl iron particles;

(b) 0.5 to 20 parts of magnetosolid particles having their own magnetic moment selected from the group consisting of oxidized magnetite and chromium dioxide, the magnetosolid particles being adsorbed on the surface of the magnetosoft particles;

(c) 4 to 9 parts of a silicon dioxide stabilizer; and (d) 25 to 55 parts of a carrying fluid comprising 5 to 10 weight percent polyvinyl-n-butyl ether, 0.01 to 1.0 weight percent α-naphthol and 90 to 95 weight percent kerosene.

10. A method of making a stable magnetorheological fluid composition comprising:

(a) preparing a carrying fluid comprising a vinyl ether, an aromatic alcohol and an organic solvent;

(b) preparing a first carrying fluid composition comprising magnetosoft particles, a stabilizer and a first sample of the carrying fluid;

(c) preparing a second carrying fluid composition comprising magnetosolid particles having their own magnetic moment comprising oxidized magnetite or chromium dioxide and a second sample of the carrying fluid; and (d) admixing the first carrying fluid composition and the second carrying fluid composition.

11. A method according to claim 10 wherein the second carrying fluid composition further comprises oleic acid.

12. A method according to claim 10 wherein the magnetosoft particles comprise carbonyl iron and the stabilizer is silicon dioxide.

13. A method according to claim 10 wherein the organic solvent is kerosene.

14. A ferromagnetic particle system suitable for use in a rheologic fluid comprising a first, magnetosoft particle comprising a carbonyl iron whose surface has adsorbed thereon second, relatively smaller needle-like magnetosolid particles having their own magnetic moment comprising oxidized magnetite or chromium dioxide.

15. A magnetorheological fluid composition comprising:

first particles comprising chromium dioxide magnetosolid particles having their own magnetic moment and being adsorbed on the surface of second particles comprising relatively larger magnetosoft particles;

a stabilizer; and a carrying fluid comprising an aromatic alcohol, a vinyl ether, and an organic solvent, in proportions sufficient to provide substantially no agglomeration or sedimentation of magnetic particles over temperatures of from about −50° to 120° C.

16. A magnetorheological fluid composition comprising:

(a) 20 to 70 parts of magnetosoft carbonyl iron particles;

(b) 0.5 to 20 parts of chromium dioxide magnetosolid particles having their own magnetic moment, the magnetosolid particles being adsorbed on the surface of the magnetosoft particles;

(c) 4 to 9 parts of a silicon dioxide stabilizer; and (d) 25 to 55 parts of a carrying fluid comprising 5 to 10 weight percent polyvinyl-n-butyl ether, 0.01 to 1.0 weight percent α-naphthol and 90 to 95 weight percent kerosene.

17. A method of making a stable magnetorheological fluid composition comprising:

(a) preparing a carrying fluid comprising a vinyl ether, an aromatic alcohol and an organic solvent;

(b) preparing a first carrying fluid composition comprising magnetosoft particles, a stabilizer and a first sample of the carrying fluid;

(c) preparing a second carrying fluid composition comprising chromium dioxide magnetosolid particles having their own magnetic moment and a second sample of the carrying fluid; and (d) admixing the first carrying fluid composition and the second carrying fluid composition.

18. A ferromagnetic particle system suitable for use in a rheologic fluid comprising a magnetosoft particle comprising a carbonyl iron whose surface has adsorbed thereon relatively smaller needle-like chromium dioxide magnetosolid particles having their own magnetic moment.

* * * * *